US005502812A

United States Patent [19]
Leyre et al.

[11] Patent Number: 5,502,812
[45] Date of Patent: Mar. 26, 1996

[54] METHOD AND SYSTEM FOR AUTOMATIC FAULT DETECTION AND RECOVERY IN A DATA PROCESSING SYSTEM

[75] Inventors: Xavier Leyre, Cannes; Michel Senaux, Valbonne, both of France

[73] Assignee: Aerospatiale Societe Nationale Industrielle, France

[21] Appl. No.: 418,264

[22] Filed: Apr. 6, 1995

Related U.S. Application Data

[63] Continuation of Ser. No. 955,830, Oct. 2, 1992, abandoned.

[30] Foreign Application Priority Data

Oct. 4, 1991 [FR] France ............................. 91 12247

[51] Int. Cl.$^6$ ................................................ G06F 11/00
[52] U.S. Cl. ........................... 395/182.08; 395/184.01; 395/185.08
[58] Field of Search ................. 395/182.08, 182.09, 395/182.11, 184.01, 185.08

[56] References Cited

U.S. PATENT DOCUMENTS

| | | | |
|---|---|---|---|
| 4,200,226 | 4/1980 | Piras | 371/9.1 |
| 4,371,754 | 2/1983 | De et al. | 371/9.1 |
| 4,377,000 | 3/1983 | Staab | 371/11 |
| 4,517,639 | 5/1985 | Ferrell et al. | 364/186 |
| 4,553,204 | 11/1985 | Hashimoto | 364/200 |
| 4,654,846 | 3/1987 | Goodwin et al. | 371/8 |
| 4,726,024 | 2/1988 | Guziak et al. | 371/16.3 |
| 4,742,469 | 5/1988 | Haines et al. | 364/466 |
| 4,868,818 | 9/1989 | Madan et al. | 371/11 |
| 5,048,017 | 9/1991 | Breneman | 371/16.3 |
| 5,073,853 | 12/1991 | Johnson | 395/575 |
| 5,139,218 | 8/1992 | Bird et al. | 249/165 |
| 5,155,729 | 10/1992 | Rysko et al. | 371/9.1 |
| 5,185,693 | 2/1993 | Loftis et al. | 364/187 |
| 5,202,887 | 4/1993 | Ueno et al. | 371/10.1 |

FOREIGN PATENT DOCUMENTS 8602183  4/1986  WIPO ........................... G06F 11/28

OTHER PUBLICATIONS

Microprocessing and Microprogramming, Aug. 27, 1989, pp. 233–237.

*Primary Examiner*—Robert W. Beausoliel, Jr.
*Assistant Examiner*—Joseph E. Palys
*Attorney, Agent, or Firm*—Remy J. VanOphem; John VanOphem

[57] ABSTRACT

In the event of failure of a processor module (PMI) which is part of a data processing system the processor module (III.1) is turned off and then on; preferably, complete reconfiguration (III.2) of the module is commanded only if at least one other fault, the number of which can be chosen at will, is detected in a given time ($T_{max}$) from the first fault replacing it with another available cold redundant processor module.

29 Claims, 10 Drawing Sheets

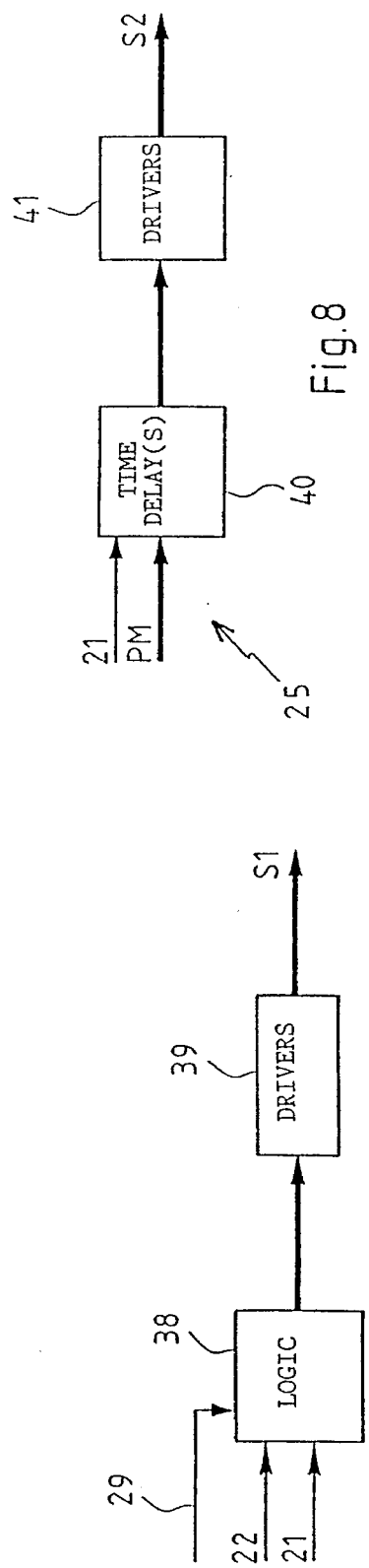
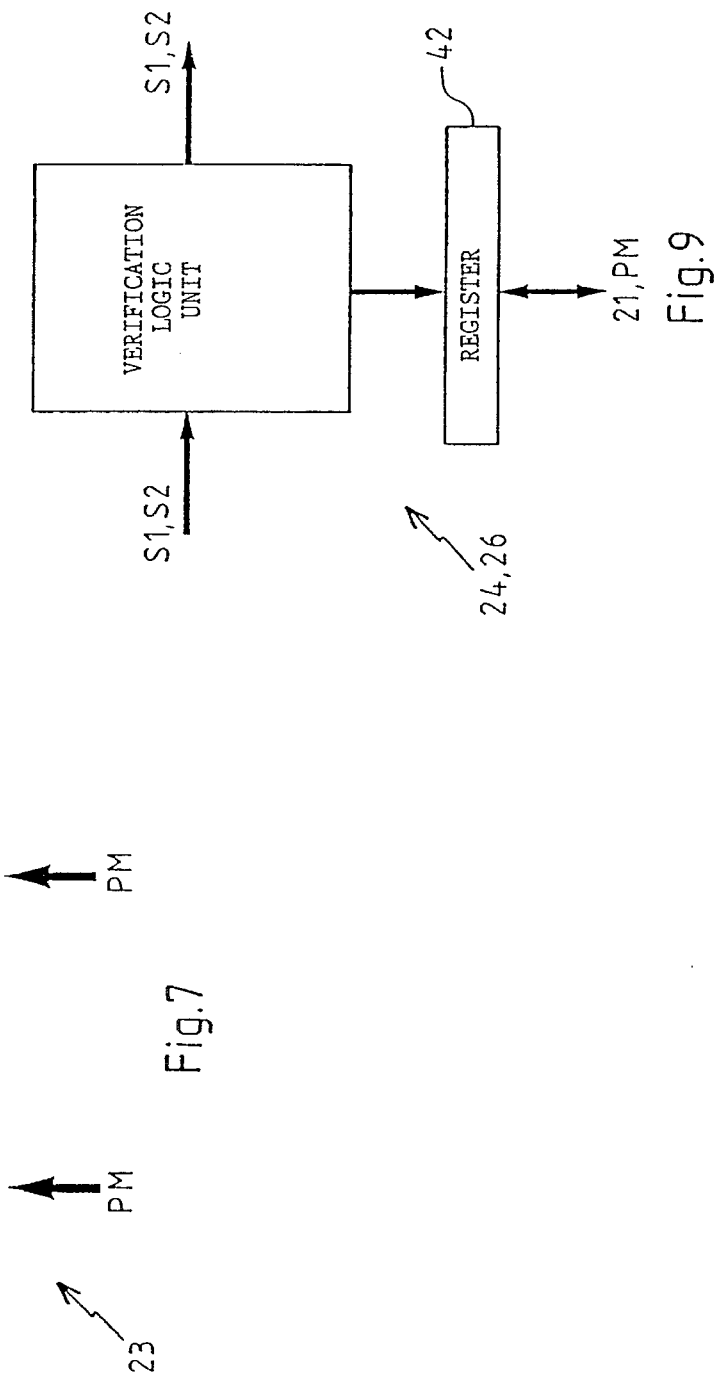
Fig.8
Fig.9
Fig.7

METHOD AND SYSTEM FOR AUTOMATIC FAULT DETECTION AND RECOVERY IN A DATA PROCESSING SYSTEM

This is a continuation of application Ser. No. 07/955,830, filed Oct. 2, 1992, now abandoned.

BACKGROUND OF THE INVENTION

1. Field of the Invention

The invention concerns passivating processor faults in a data processing system especially, but not exclusively, a system on board a spacecraft which is required to be highly fault tolerant in a hostile environment.

2. Description of the Prior Art

A spacecraft data processing system must meet various requirements in practice, namely high reliability (ability to overcome faults to the greatest possible degree without outside assistance), minimal mass and minimal costs.

Minimizing overall costs presupposes minimizing not only the hardware cost of the data processing system but also the requirement for supervision from the ground and the duration of potential mission outages.

Data processing systems for use in space have already been proposed and are described, for example, in "SPACE SHUTTLE AVIONICS SYSTEM"— NASA SP-504—1989—J. F. HANAWAY, R. W. MOOREHEAD and in "Study of a Unified Hardware and Software Fault Tolerant Architecture"—NASA Contractor Report 181759—January 1989—J. LALA et al. A drawback of these systems is that they use more than two units per function (a nominal unit and a redundant unit) which leads to high mass and high cost.

Other solutions such as that described in "A 6800 Coprocessor for Error Detection in Microcomputers: The PAD"—Proceedings of the IEEE, Vol. 74, No 5, May 1986, p. 723—Y. CROUZET, J. CHAVADE, have drawbacks including the use of two microprocessors that have to operate simultaneously, which leads to considerable complexity.

The invention, however, concerns a centralized data processing system, in other words one with only one processor unit in service at any given time, requiring only a very small number of "cold" redundant units (typically one unit per function) to achieve the usual levels of reliability.

SUMMARY OF THE INVENTION

An object of the invention is, therefore, a method for detecting/passivating serious faults, especially processor faults, which makes it possible to obtain the maximum benefit of processors that are operational (of which there may be only one) and various other units of the system, minimizing the risk of relegating a unit that is still usable and of commanding premature reconfiguration thereof (reconfiguration=replacement by an available "cold" redundant unit), and all this with a short reaction time.

The invention resides in a method of detecting and passivating faults in a self-contained data processing system in a hostile environment embodying a processor module provided with a watchdog and units connected to the processor module by a bus, in which method a watchdog output signal is compared with a threshold value and, if the output signal exceeds the threshold value, the processor module is turned off and on again.

In a preferred embodiment of the invention, if the output signal exceeds the threshold value, a clock is started and the number of times during a given period starting from this starting of the clock the output signal again exceeds the threshold value is compared with a threshold number and if the number reaches the threshold number the replacement of the processor module by another available cold redundant processor module is commanded.

It will be understood that this approach goes against received wisdom whereby, with a view to reacting quickly to faults, the standard practice is to switch over to an available "cold" standby unit immediately when a fault is detected without carrying out any fault analysis.

According to preferred, optionally combinable features the threshold number is 1, and the given period is between five and 60 seconds, preferably approximately 10 seconds.

To turn the processor module off and on or to replace the processor module the generation of a reconfiguration pulse with given characteristics is commanded and if the output signal remains below the threshold value the generation of at least one test pulse having only one of the given characteristics is commanded and whether the test pulse has the required given characteristic is verified, the given characteristics being the voltage and the duration of the reconfiguration pulse.

The processor module additionally monitors status signals representing good operation or malfunctioning of units connected to the bus and if the processor module detects a status signal representing malfunctioning of one of the units a driver external to the processor module replaces the unit with an available cold redundant unit after a time-delay at least equal to the time needed to turn off and on the processor module, the time-delay being disabled on instigating turning on and off of the processor module. The time-delay is between 0.5 and 50 seconds, and preferably between 0.5 and 5 seconds.

The processor module further monitors status signals representing correct operation or malfunctioning of basic units connected to the bus by the units and if the processor module detects a status signal representing malfunctioning of one of the basic units the processor module replaces the basic unit by an available cold redundant unit after a second time-delay at least equal to the sum of the time-delay before a unit is replaced by an available cold redundant unit and the time taken by the replacement; the second time-delay being disabled by replacement of a unit. The second time-delay is preferably between one and 10 seconds, and the first time-delay is approximately 0.5 seconds.

A plurality of units of at least one level are connected to the processor module and independently of the units and the processor module status signals representing the status or the attitude of the spacecraft are monitored. If one of the signals exceeding a threshold value is detected the processor module, the bus and all units are replaced independently of the processor module by an available cold redundant processor module, bus and unit after an overall time-delay at least equal to the time required successively to replace the processor module and then the units level by level starting at the highest level. The overall time-delay is at least one minute, preferably, between one and 10 minutes.

For implementing the method the invention also proposes a centralized hierarchical data processing system on board a spacecraft embodying a computer unit and units on at least one level and connected to a processor module which is part of the computer unit wherein the computer unit further embodies a reconfiguration module separate from the processor module and, connected to a data transfer bus, a processor module reconfiguration unit adapted to send a turn off/on pulse, a self-test unit, a test verification unit connected to the output of the processor module reconfiguration unit, a backup memory unit and an interface module to the processor module. The processor module has an on/off control terminal connected to an output of the processor module reconfiguration unit and the reconfiguration module has an on/off control terminal connected to a module independent of the processor module module.

According to preferred, optionally combinable features the computer unit includes a second available cold redundant processor module and a second cold redundant reconfiguration module;

the reconfiguration module embodies a second reconfiguration unit connected to the bus and adapted to generate at the command of the processor module a reconfiguration pulse for one of the units connected to the bus; and the reconfiguration module is further connected by lines independent of the units, the bus, and the processor module to sensors responsive to status parameters representing the status of the spacecraft.

Objects, features and advantages of the invention will emerge from the following description given by way of non-limiting example with reference to the appended drawings.

BRIEF DESCRIPTION OF THE DRAWINGS

FIG. 7 is a block diagram of the reconfiguration unit of the processor module included in the reconfiguration module;

FIG. 8 is a block diagram of the coupler reconfiguration unit included in the reconfiguration module;

FIG. 9 is a block diagram of the verification logic units associated with the reconfiguration units of FIGS. 7 and 8;

DETAILED DESCRIPTION OF THE PREFERRED EMBODIMENT

Figure 1:
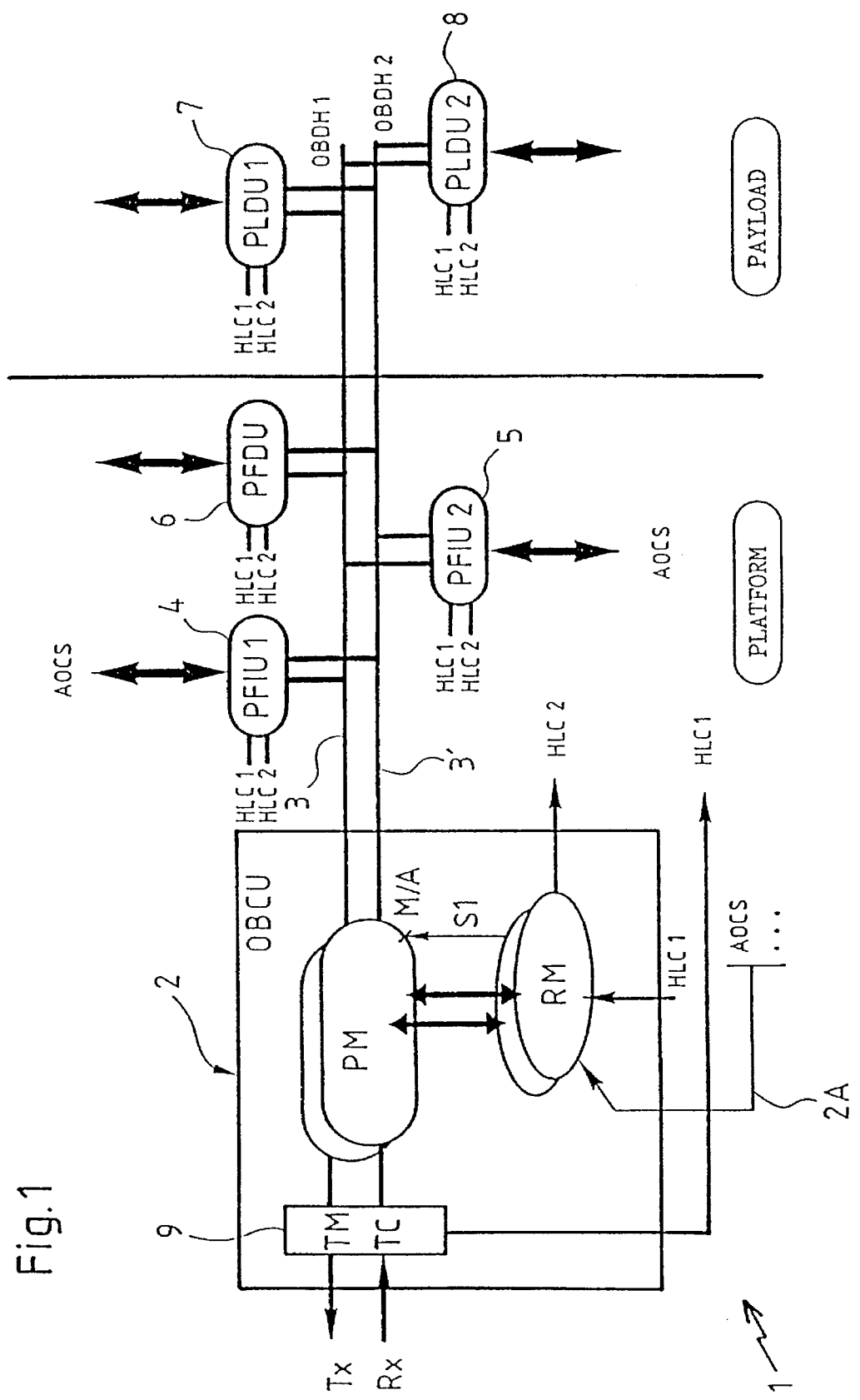
FIG. 1 is a block diagram of a satellite data processing system in accordance with the invention.

FIG. 1 shows a data processing system 1 for a spacecraft such as a satellite (not shown) of any known type, for example a three-axis stabilized satellite in a geostationary or heliosynchronous orbit.

The system 1 is a centralized and hierarchical system. It essentially is composed of an on board computer unit (OBCU) 2, two redundant buses 3 and 3' (preferably on board data handling (OBDH) buses) with a data transmission rate up to 512 kbps (kilo bits per second) and various interface units connected to input and output devices of the system 1. The interface units or couplers here are two platform interface units (PFIU) 4 and 5 which are for example specific to the detectors/actuators of the satellite attitude and orbit control subsystem (AOCS), a platform distribution unit (PFDU) 6 responsible for distributing power to the platform and two (or alternatively a single) payload distribution units (PLDU) 7 and 8 responsible for management of payload power distribution and thermal behavior (the number of these units depends on the size of the payload).

The OBCU 2 and the couplers 4 through 8 are of the internal cold redundant type (this is symbolized for the unit 2 by the duplication of its component parts).

The OBCU 2 includes a communication module 9 adapted to send data to the ground (Tx) and to receive commands from the ground (Rx). The OBCU 2 and the couplers 4 through 8 exchange high level command signals HLC1 or HLC2 independently of the buses 3 (or 3'). These signals represent magnitudes such as start/stop relay, for example.

According to one advantageous feature of the invention, which is novel in itself, direct electrical, radio or optical links 2A are provided between some sensors (terrestrial, solar, etc.) of the attitude and orbit control system or sensors associated with electrical power supply, thermal or other conditions, and the OBCU to transmit to the latter parameters, including satellite inertial parameters, selectable on board, such as the presence or absence of the Earth or the Sun in the field of view of their respective detectors. More generally, these lines may also originate from units associated with satellite power supply or thermal control.

Figure 2:
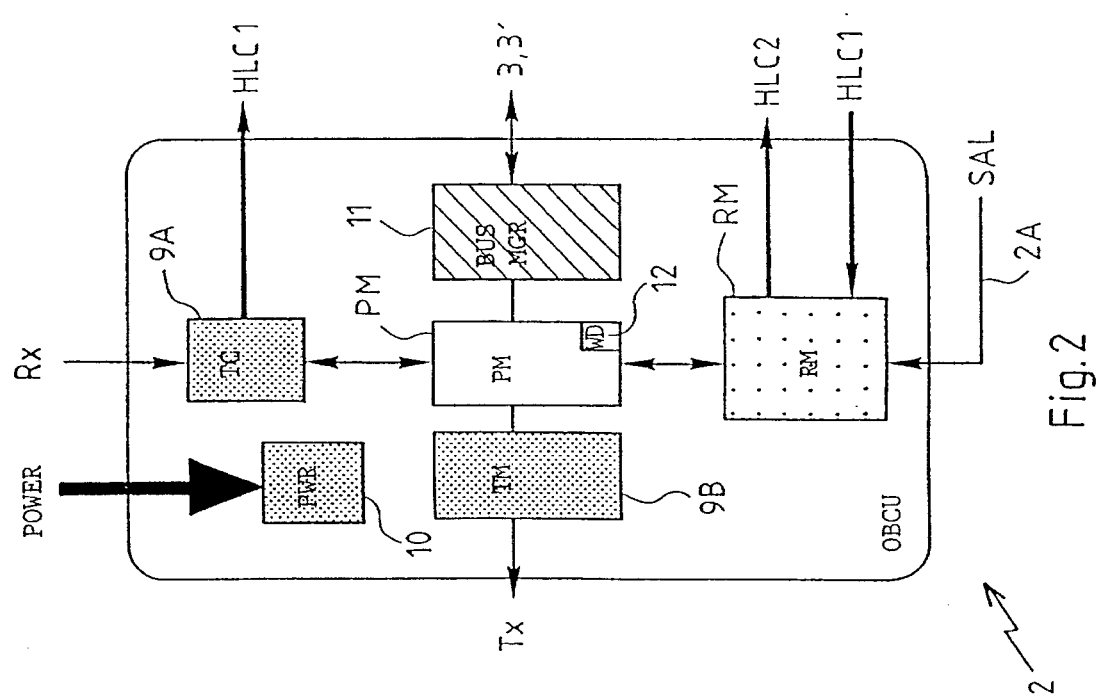
FIG. 2 is a block diagram of the on board computer unit.

FIG. 2 is a block diagram of the OBCU 2. Here this unit embodies (with internal redundancy) a processor module PM (having a microprocessor provided with volatile RAM and non-volatile ROM), a power module 10, a telecontrol (TC) module 9A and a telemetry (TM) module 9B together forming the communication module 9, a bus manager module 11, a watchdog module 12 and, according to one important aspect of the invention, a reconfiguration module RM at which the links 2A terminate.

The reconfiguration module RM is adapted to enable reconfiguration to be commanded on board which reduces the requirement for supervision from the ground and, most importantly, reaction times. The need to reduce the risk of mission outages leads to two requirements: firstly, the system 1 must be fault tolerant ("fail safe") in the event of a single fault and secondly, recovery after a single fault must be processed automatically on board.

It will emerge from the following description that, by virtue of the invention, a simple internal cold redundant structure can meet these requirements while minimizing the mass and the cost of the system 1.

To enable reconfiguration to be commanded on board, it has been necessary to determine a classification of faults so that an automatic strategy for dealing with them can be produced.

A classification into four levels has been adopted, representing increasing degrees of seriousness.

The first level, or level I, covers all the units (detectors and actuators in particular) which are connected to the bus 3 by the couplers 4 through 8.

The second level, or level II, covers the various couplers 4 through 8.

The third level, or level III, covers the processor module PM.

The fourth level, or level IV, covers all of the system, namely the units, couplers, buses and processor module, and uses system alarm signals SAL carried by the lines 2A which represent anomalies in the parameters or magnitudes of the sensor in question.

It is evident that the processor module PM and the system 1 as a whole cannot be supervised by the processor module PM itself. The invention provides a second supervisory module: this is the reconfiguration module RM. It would have been possible to implement this supervisory function using a plurality of processor modules (at least three hot redundant units would have been required), but the reconfiguration module concept has the advantages of lower mass, lower cost and lower complexity and therefore greater reliability.

As will be explained, the reconfiguration module provides a high degree of on board autonomy whereby the risk of mission outages can be eliminated for level I, II or III faults.

In fact, the reconfiguration module is operative only for level II and above: for fault level II it merely executes (after an appropriate time-delay—see below) any reconfiguration instructions generated by the processor module PM software on the basis of a fault detected by software via the bus 3.

For level I the detection of a fault and the instigation and execution of any reconfiguration (after a longer time-delay than that for level II—see below) are handled by software via the bus 3.

The practical implementation of what is described above will be evident to one skilled in the art without further explanation.

For level III, processor module peripheral supervision is handled by the software, hardware supervision is handled by the hardware (watchdog). A distinction is drawn between two degrees of seriousness.

This will be explained in more detail later.

The reconfiguration module has three main functions:

alarm detection and validation;

reconfiguration (replacement of a unit in the system by an available cold redundant unit); and backing up reliable data which must be available at all times.

The role of the reconfiguration module is to respond to alarm signals by generating appropriate command signals to reconfigure only that part of the system which requires reconfiguration.

Figure 3:
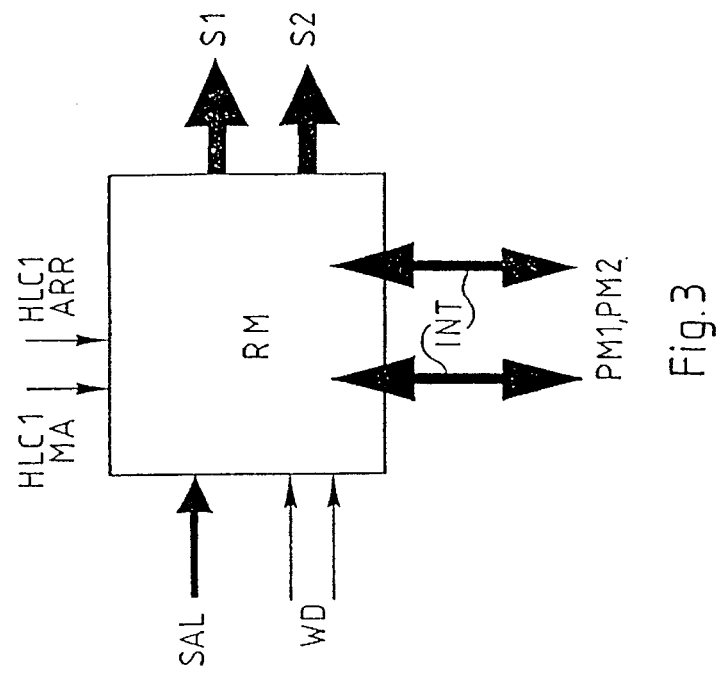
FIG. 3 is a block diagram of the reconfiguration module included in the on board computer unit.

FIG. 3 shows the data exchanged by this module with the external environment.

Alarms processed by the reconfiguration module RM can be classified in three groups:

system alarms (level IV) (signals SAL);

watchdog alarms (signals WD); and coupler alarms (triggering signals from the active processor module).

Signals HLC1-MA and HLC1-ARR transmitted from the ground turn the reconfiguration module RM on and off, respectively.

The reconfiguration module communicates with the nominal processor module PM1 (or with the redundant module PM2) in particular to receive coupler reconfiguration commands via parallel interfaces INT.

The module generates activation-deactivation selection signals sent to the processor module (signals S1) or to the couplers (signals S2).

The reconfiguration module includes various registers and volatile memory areas which are protected against random events (for example by a conventional error detection and correction (EDAC) code) and against writing by the active processor module should the latter fail. These registers and memory areas can be read and written by the processor module PM subject to access rights and protocols which will be evident to one skilled in the art. Finally, the reconfiguration module RM includes hardware protection (for example using a parallel link or hardware circuitry 29 as shown in FIGS. 4, 5 and 7) so as to disable generation at the output of a spurious reconfiguration command signal in the absence of any input signal.

Figure 4:
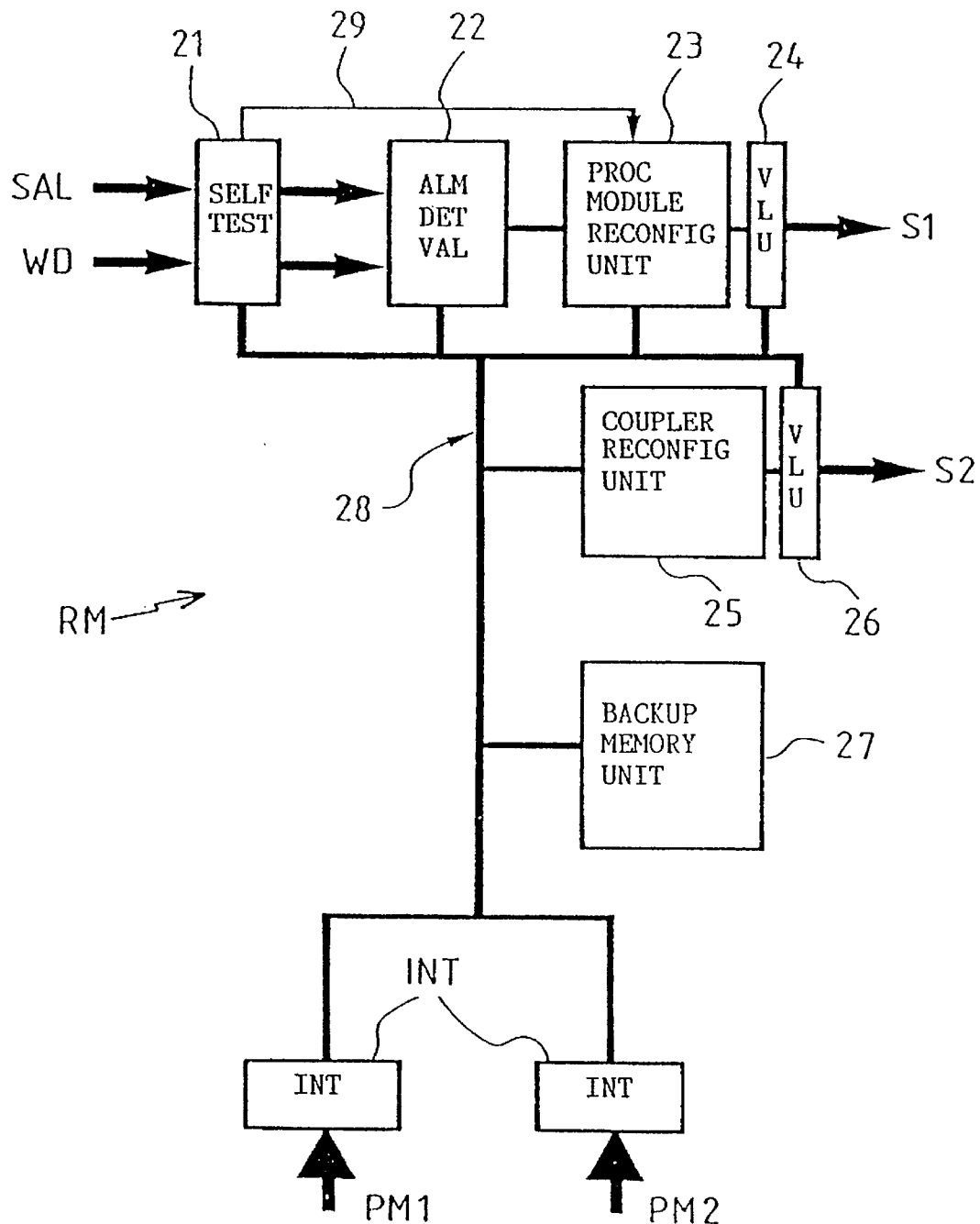
FIG. 4 is a more detailed block diagram of the reconfiguration module.

Referring to FIG. 4, the reconfiguration module embodies a plurality of functional units between which the aforementioned registers and memory areas are distributed. The reconfiguration module includes a self-test unit 21; an alarm detection and validation unit 22 (for levels III and IV); a processor module reconfiguration unit 23 connected to the self-test unit 21 by the parallel link 29 and to which a verification logic unit 24 is connected; a coupler reconfiguration unit 25 to which a verification logic unit 26 is connected; a backup memory unit 27; and a connecting bus 28.

Figure 5:
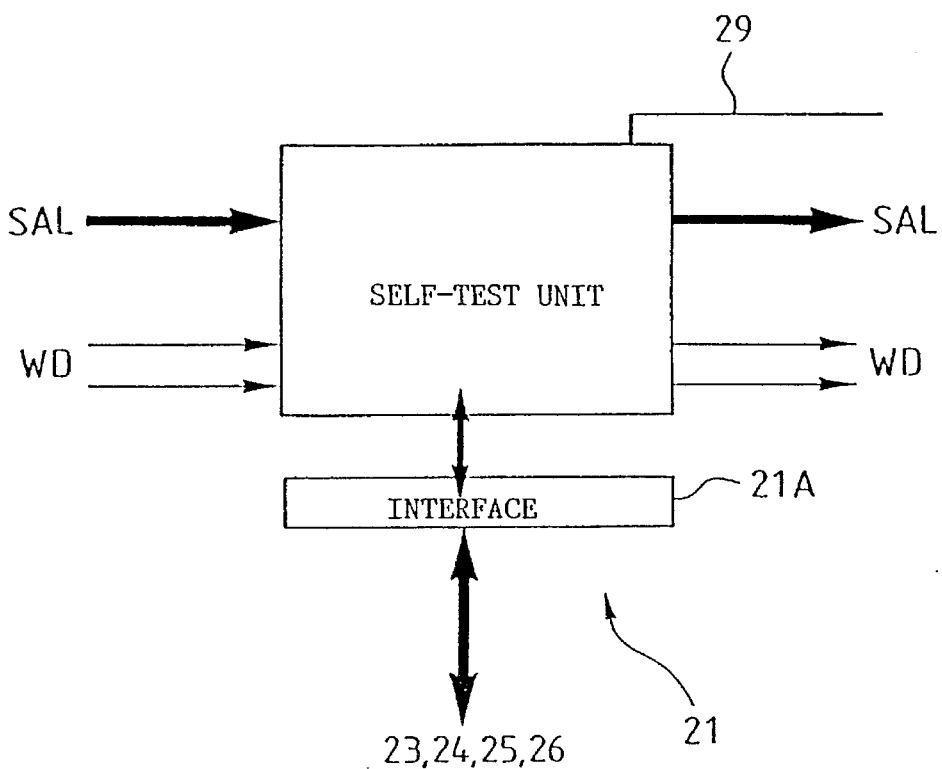
FIG. 5 is a block diagram of the self-test unit included in the reconfiguration module.

FIG. 5 shows the self-test unit 21 at the input of the reconfiguration module. Its function is to simulate all possible types of SAL or WD alarms that may originate from the system or the watchdog. It includes logic capable of generating all dummy alarm combinations contained in a register included in this unit. The unit receives real alarm signals from the system (level IV) or from the watchdog (level III) and supplies either dummy alarm signals or real alarm signals when an alarm condition exists, these output signals having the same physical characteristics whether they represent real alarms or dummy alarms; it also exchanges signals with the processor module reconfiguration unit 23 and the verification logic units 24 and 26 (see below) via an interface 21A connected to the bus 28.

If a real fault occurs all the test procedures are interrupted, the interfaces INT between the reconfiguration module and the processor modules PM1 and PM2 are disabled, the nominal parameter values of the various units are reloaded from the backup memory unit 27 (they may have been modified by a test procedure) and nominal processing of alarms is instigated.

Figure 6:
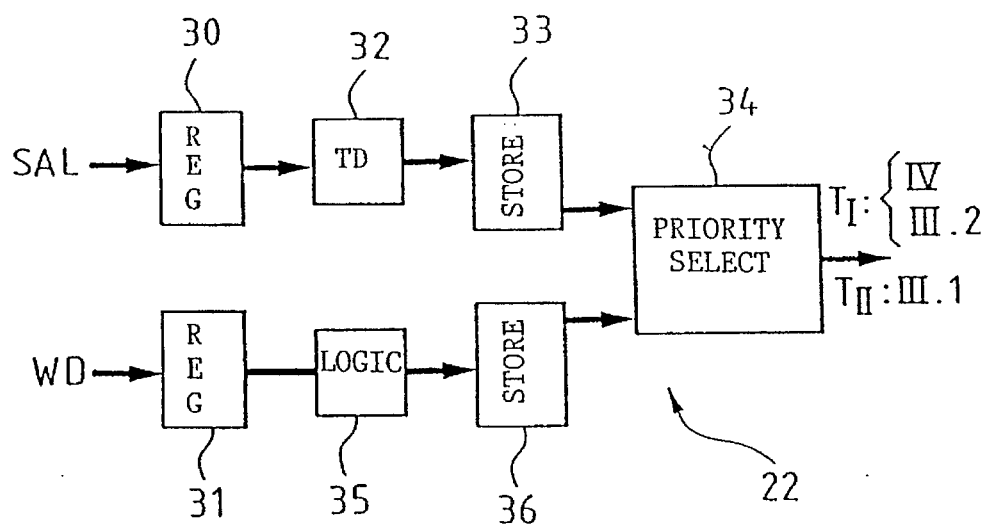
FIG. 6 is a block diagram of the alarm detection and validation unit included in the reconfiguration module.

FIG. 6 shows the alarm detection and validation unit 22.

This unit includes registers 30 and 31 (or masking tables) for retaining or rejecting all system or watchdog alarm input combinations (for example, loss of the Earth signal will be interpreted as a system alarm signal during an observation mission but as normal in the mode in which the satellite is pointed at the Sun). A level IV alarm will be validated if at least one of the system alarm inputs is activated. Likewise a level III alarm will be validated if at least one of the watchdog alarm inputs is activated. In practice a watchdog alarm indicates that the watchdog output signal has crossed a threshold (in practice a null threshold) which while normally at a null level suddenly goes to a given positive level, for example.

According to one advantageous aspect of the invention a time-delay unit 32 introduces a time-delay into a level IV alarm signal (see below, especially with reference to FIGS. 17 and 18). This time-delay may be loaded by the processor module PM: this level IV alarm must then be present for at least the time period defined by this time-delay or it is ignored. If this condition is met, the alarm signal is stored at 33 as a valid level IV alarm (a flag changes state) and sent to the priority selector 34.

In the case of watchdog alarms, count and clock logic 35 is advantageously provided to send a first type of level III alarm signal (denoted III.1) when a watchdog alarm is received and then, in the event of a plurality of watchdog alarms in a given period starting with the first alarm, a second type of level III alarm signal (denoted III.2). Once generated/validated, these alarm signals are stored at 36 so that the processor module can identify the source of the alarm.

The priority selector 34 gives priority to level IV: it generates two types of output signals depending on whether the alarm is of type IV or III.2: type I output $T_I$; or the alarm is of type III.1: type II output $T_{II}$.

This distinction between the III.1 and III.2 alarm types is one aspect of the invention novel in itself.

FIG. 7 shows the reconfiguration unit 23 of the processor module. It includes a processor reconfiguration register indicating the processor module and the associated power converter to be used in the event of reconfiguration. It also includes a subregister containing data supplied by the self-test unit 21 indicating if the current reconfiguration process is part of a test procedure (as many stages as there are test procedures) or a real reconfiguration: this will condition the output signals (see above).

The reconfiguration unit includes logic 38 with two types of input, one of which corresponds to the two types of output of the alarm detection and validation unit 22.

In the case of a $T_I$ input corresponding to the type I output (level IV or III.2 alarm) the logic instigates the generation of a pulse adapted to command switchover to the redundant processor module (and the associated power converter) allowing for the content of the processor reconfiguration register.

In the case of a $T_{II}$ input corresponding to the type II output (level III.1 alarm) the logic generates a pulse adapted to reset (turn off and on again) the processor module used until then.

The logic 38 receives as its other input a signal from the self-test unit 21 conveyed in practice by the bus 28 indicating whether this is a test procedure (and if so, of which type) or a real reconfiguration. Finally, it receives a disabling signal via the parallel link 29.

Real reconfiguration is effected by drivers 39 generating a control pulse S1.

Both the logic 38 and the drivers 39 of the reconfiguration unit can receive data from the active processor module PM via the bus 28.

FIG. 8 shows the coupler reconfiguration unit 25. This unit merely executes reconfiguration operations instigated by the processor module PM via the bus 28.

The coupler reconfiguration unit 25 therefore receives at its input a triggering signal from the processor module indicating which coupler must be activated and which must be deactivated. A test register containing data from the self-test unit 21 indicates if this reconfiguration is part of a test procedure or a real reconfiguration.

The coupler reconfiguration unit 25 includes one or more time-delay(s) 40 for drivers 41 which generate pulses S2 for reconfiguring the coupler.

FIG. 9 shows the structure of the verification logic units 24 and 26. These logic units are adapted to test reconfiguration pulses sent by the drivers 39 or 41 of the reconfiguration and coupler reconfiguration units 23 and 25, respectively. Two tests carried out by each of the logic units 24 or 26, respectively, cover, for example, the voltage and the duration of the pulses (denoted test 1 and test 2); the values obtained are stored in a register 42 accessible to the processor module PM.

In practice a reconfiguration operation (including a III.1 reconfiguration) is commanded by relays which change state only on receiving a pulse of sufficient energy. To achieve this the real command pulse is calibrated in terms of its voltage and its duration whereas the pulses generated during test procedures, depending on the test to be carried out, are at the required voltage (typically 26 V) for a very short time (test 1) or at a very low voltage (typically 3–4 V) for the required time (typically 45 ms—test 2); in other words they do not have sufficient energy to operate the relays.

The backup memory unit 27 is dedicated to storage of dynamic data of the system 1 and software modules.

Thus correct data and software modules are available at all times, even if the processor module or the watchdog fails or if there is a power failure.

There is a backup memory unit for each reconfiguration module. Each processor module can write and read the backup memory unit currently in use (there is only one memory unit active at a time).

Note that optimum use of the reconfiguration module concept presupposes the existence of the self-test procedure (see above comments concerning units 21, 23 through 26), failing which failure of this module will not be detected until the need for reconfiguration appears and is not met. In this case the entire system is in serious danger because the first fault will not be overcome. The self-test can naturally not be processed by the reconfiguration module itself; the processor module must process the self-test but can merely monitor the execution of a self-test and, if it detects a problem, in other words a reconfiguration module fault, advise the ground by telemetry. The processor module cannot operate on the reconfiguration module to eliminate the risk of looping these modules. Switchover to the redundant reconfiguration module can be commanded from the ground and this applies to disconnection of both reconfiguration modules in response to the results of the self-tests and behavior of the satellite, of course.

It is important to note that the mission and the behavior of the satellite do not depend on the availability or unavailability of an operational reconfiguration module. It is always possible to command from the ground all of the tasks required of the mission (especially the reconfiguration operations) if there is no operational reconfiguration module. However, the autonomy of the satellite is reduced in the sense that automatic fault passivation and automatic reconfiguration are restricted to level I. The other levels must then be handled from the ground although the possibility is retained of automatic reaction from the ground in the manner of a third reconfiguration module using conventional high priority command modules.

The above discussion can be summarized as follows. In the event of one or more units failing, failure is detected by the processor module software; the reaction is commanded by the processor module and executed (after a time-delay) by the associated coupler. A level I fault of this kind will not cause any mission outage.

In the event of one or more couplers failing, failure is detected by the processor module software; the reaction is commanded (after a time-delay) by the processor module and executed by the reconfiguration module. A level II fault of this kind does not cause any mission outage.

In the event of the processor module or watchdog failing, failure is detected by the watchdog and the reconfiguration module; the reaction is commanded and executed by the reconfiguration module and a level III fault of this kind does not cause any mission outage.

In the event of the system failing (failure not detected or not corrected by lower levels), failure is detected by the reconfiguration module by virtue of the system alarm signals carried by the lines 2A; after a time-delay, the reaction is commanded and executed by the reconfiguration module. A level IV fault of this kind causes a mission outage but after a reaction which is commanded automatically (and on board), and is of limited duration (typically a few minutes); it then remains to decide subsequent action.

In the event of the reconfiguration module failing, failure is detected by the processor module which monitors the self-tests and advises the ground of the failure; the reaction is commanded from the ground, automatically or manually, without any mission outage.

The reconfiguration strategies for the various levels will now be explained in more detail.

Figure 10:
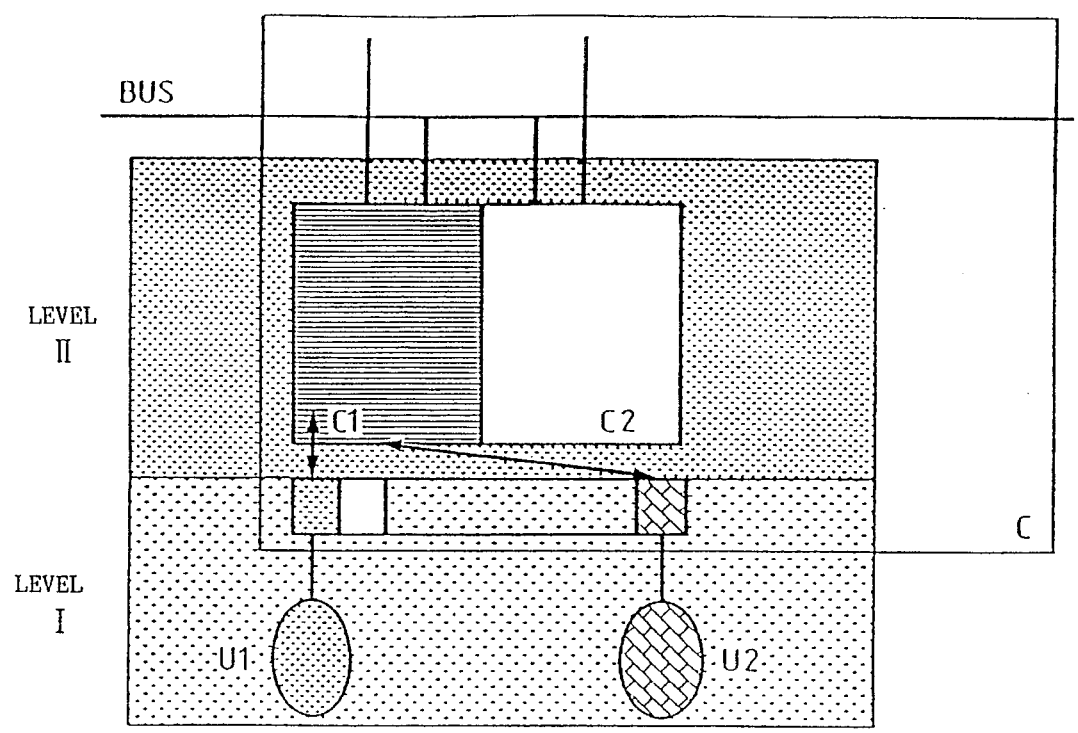
FIG. 10 is a diagram showing the principle of level I reconfiguration.

With reference to level I, the essentials have already been covered. The decision and the actions (after a time-delay) which reconfigure a unit such as the unit U1 in FIG. 10 are taken by application software on the basis of parameters characteristic of the unit (these parameters are, for example, values of a secondary voltage in the unit). These reconfiguration actions are transmitted by the processor module via the bus 3 and a coupler C (active part C1 and redundant part C2) to the unit in question. The coupler C1 then connects to the redundant unit U2 if the latter has not yet been used. All of the data associated with this pair of units U1 and U2 (which unit is currently in use?, is there still an available unit?, etc.) is stored and protected in the backup memory unit 27. In no case is there a mission outage.

Figure 11:
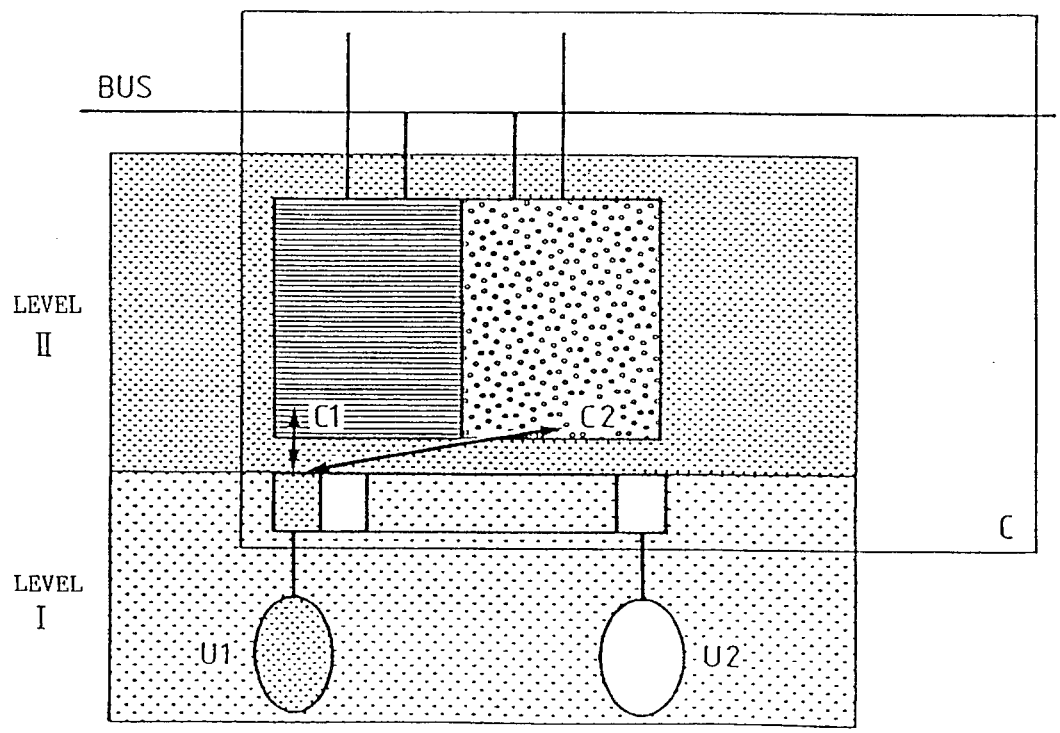
FIG. 11 is a diagram showing the principle of level II reconfiguration.

With reference to level II (see FIG. 11) the essentials have also been covered already. The decision and the instigation of action to reconfigure a coupler such as the coupler C are commanded (after a time-delay) by application software on the basis of parameters characteristic of the coupler (for example, the result of a conventional test of decoding a test function of the OBDH standard). Execution of the reconfiguration action (change from C1 to C2) is handled by the reconfiguration module. This is because the couplers are connected to the bus and therefore become inaccessible in the event of failure at the interface between the couplers and the buses. Another solution would have been to have each coupler monitored and controlled by another; however, this solution would have the drawbacks of great complexity and ambiguity as to the location of a fault once detected. Only a chained structure of couplers would enable such ambiguity to be resolved, but at the cost of even greater complexity in the software and wiring.

For level II the role of the reconfiguration module is merely that of a "passive" executant: in this respect there is no logic and there is no intelligent action within the reconfiguration module. The module acts only on instructions from the processor module, which operates on the reconfiguration module drivers only to operate directly on the coupler concerned.

Within a coupler the reconfiguration action may affect more than one module; irrespective of the number of modules, the automatic on board reconfiguration strategy in theory provides for switchover to all available backup modules. As for level I, the status of the coupler modules (which ones are currently in use?, which remain available? etc.) is stored and protected in the backup memory unit 27.

Following reconfiguration, the old modules which have been disconnected are regarded as no longer available until telemetry has enabled personnel on the ground to identify the modules that have actually failed and to modify accordingly the status in the memory unit of the modules that are not faulty. As already mentioned, there is no mission outage.

Figure 12:
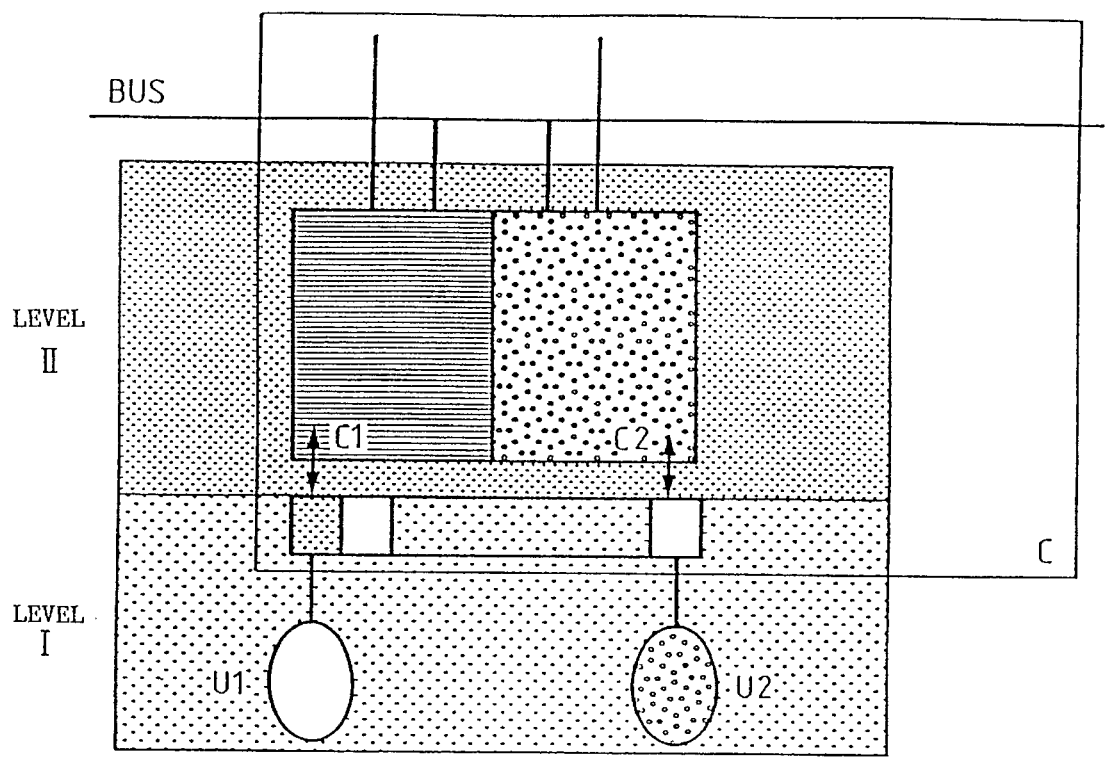
FIG. 12 is a diagram showing the principle of combined level I and II reconfiguration.

FIG. 12 shows a situation in which the combined reconfiguration actions affect levels I and II (change from C1-U1 C2-U2).

This alternative to the basic solution makes it possible to deal with cases in which the self-test signals cannot resolve ambiguity between levels I and II or in which level I reconfiguration is very lengthy.

As already mentioned, level III concerns the processor module and its peripherals, monitored by a watchdog. The objective of this level is to enable self-recovery in the event of a fault to maintain the mission by adapting the reaction (reconfiguration or otherwise) to the type of fault so as to draw the maximum benefit from the OBCU 2: in particular, an attempt is made to use the same processor module for as long as possible.

To enable the reaction to be matched to the failure, it is necessary to distinguish between different types of failure or faults such as transient data error, permanent data corruption, and hardware failure.

A typical transient data error is the result of an electrical disturbance such as an electrostatic discharge or other electromagnetic disturbance which can change a few values on the buses (this assumes that there are no changes in the memory areas).

A typical permanent corruption of data is a single event upset which can change the content of a memory area or even change completely the substance of data or even an entire program, the consequences of which can be catastrophic.

A typical hardware failure is failure of the processor module itself.

Various graded reactions are provided to suit the various types of failure.

Software automatically passivates transient errors by time filtering them, avoiding such consequences as storage of invalid data, for example. This type of error occurs above all on the OBDH BUS 3: the error rate for responses on this bus is $10^{-9}$ which, for a maximum throughput of 16,000 words per second, means one data error every 17 hours assuming 100% load (of no consequence given the aforementioned passivation).

Figure 13:
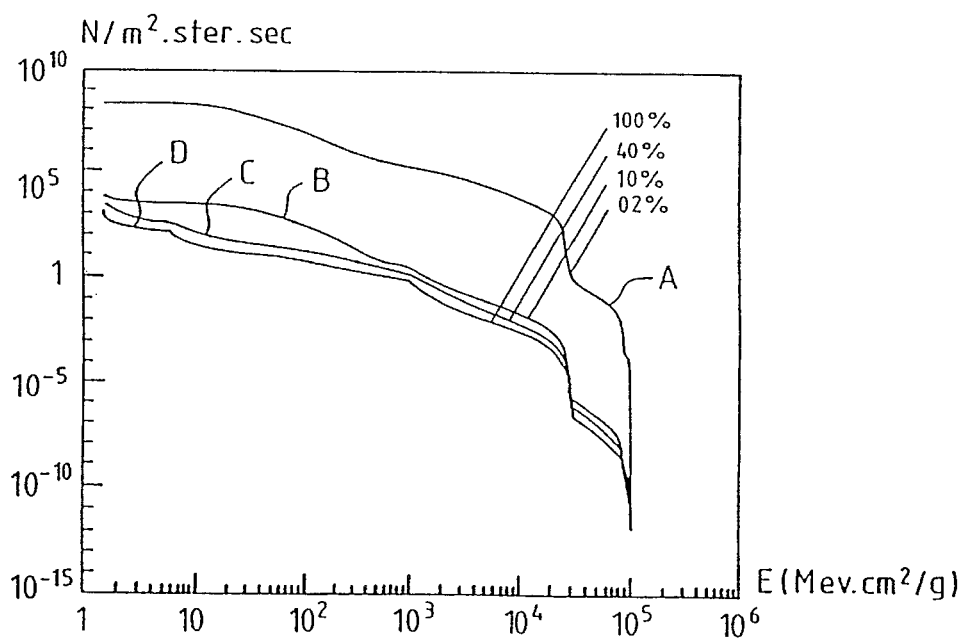
FIG. 13 is a diagram showing the correlation between the minimum particle flux density and the particle energy for various time percentages.

Permanent corruption of data is usually due to a single event, as already mentioned (and primarily the passage of particles such as heavy ions). The diagram in FIG. 13 shows the correlation between the minimum flux density of particles of energy between 2 and $10^5$ MeV.cm$^2$/g encountered in geosynchronous orbit for various fractions of any time period.

The upper curve A (0.02%) represents the energy distribution and the flux density of particles likely to cause damage during the most favorable 99.98% of the time: during the remaining 0.02% of the time (one day in a 15-year mission) the particles are more numerous and the danger is increased.

The bottom curve D (100%) represents the minimum hazard at any given time.

The curve B (10%) represents the hazard during the most favorable 90% of the time. On average, curve A is offset upwards by a ratio of around 350,000 relative to curve B. In other words, for 9.98% of the time the hazard whose spectrum is given by curve A is on average 350,000 times more serious than during the most favorable 90% of the time.

A three-fold approach is adopted to passivating faults: for the hazard valid 90% of the time, for that valid between 90 and 99.98% of the time, and for that valid during the remaining 0.02% of the time.

Passivation for the 90% case is effected by the technology itself. To this end the COMS/SOS technology is chosen for the microprocessors and memories. For this type of technology and allowing for curve B (90%) the total failure rate per chip (integrated circuit) in the OBCU for the whole of a 15 year mission is in the order of $5.10^{-3}$. In other words, for 90% of the time, the appropriate choice of technology eliminates the risk of permanent corruption of data in the microprocessor or in the memories.

During about one tenth of the time (the 9.98% between 90% and 99.98%) the risks of corruption of data are 350,000 times higher, which represents a risk of around one event per month.

Where memories are concerned, single event upsets are passivated by a conventional EDAC (error detection and correction) code which can detect and correct any single error and detect any double error. Given the low frequency of these errors and the EDAC frequency (typically around one minute) there is no problem refreshing the data from the backup memory unit 27 afterwards.

Where the microprocessor is concerned, single event upsets are processed by the watchdog and the alarm detection and validation unit 22 (FIG. 6) in the reconfiguration module. Damage to the microprocessor causing catastrophic corruption of the data held in the microprocessor (detectable by the watchdog) causes the watchdog to send an alarm signal to the reconfiguration module. This reacts as follows (see FIG. 14 in which the processor module initially in the healthy state 1 changes to the state 2 after an alarm signal WD): the counter of the count and clock module 35 of FIG. 6 is triggered if this is the first alarm and type III.1 reconfiguration is instigated, in other words the logic module 38 of FIG. 7 resets (turns off/on again) the same processor module PM refreshing the memories with the content of the ROM of this PM (this ROM remains intact unless there is a hardware failure—see below) with respect to the code and with the content of the backup memory unit 27 with respect to the critical data needed for the reset. There is no mission outage.

Because the type of failure considered here corrupts data, the reset is bound to be successful, because the memories are refreshed, and the state 3 obtained after the type III.1 reconfiguration will remain healthy beyond the counting period $T_{max}$ of the count and clock module 35 of FIG. 6: this is the same as the initial healthy state 1.

Turning now to the remaining 0.02% of the time (representing a period of one day within the entire mission), it is not possible to quantify the amplitude or the statistical distribution of particle bursts or storms above the curve A. The only way to minimize the effect of any such "storm" is to minimize the time-delay introduced by the count and clock module 35 from FIG. 6 which is used to distinguish between failure levels III.1 and III.2. The shorter this time-delay the better the system is able to weather any such storm (which merely corrupts data). However, this time delay cannot be reduced below a threshold dictated by the hardware failure time constant (at the risk of causing an infinite series of type III.1 reconfigurations in response to a hardware fault) and by the minimum time needed to change from one processor module to another in a type III.2 reconfiguration.

A time-delay $T_{max}$ in the order of 10 seconds is chosen, for example. It will be realized that a time-delay of this magnitude is very short as compared with the time (usually several hours) that would be required in practice with strategies based on decisions taken on the ground.

As already explained, hardware faults could represent total failure of the processor module, for example (the problem of an internal short-circuit type fault in any integrated circuit of the computer unit due to the passage of a heavy ion (this is called "latch up") is avoided by the chosen CMOS/SOS technology). Other types of faults are possible, however, such as power failure or clock failure in particular. Level III.2 is intended to cover these types of malfunction.

It has been shown that this type of alarm is triggered by the same alarm signal sent by the watchdog as the type III.1 alarm. The discrimination between them is based on the conjugate presence of the counter and clock functions in the count and clock module 35 of the detection and validation unit 22. Type III.2 represents the detection within the aforementioned time-delay of a number of alarms exceeding a threshold value here taken as equal to 1. If during this time-delay a second alarm is detected after a type III.1 reconfiguration has been attempted the deduction is that resetting the processor module and refreshing the memories has not been sufficient to clear the cause of the alarm (continuous fault state 4 in FIG. 14) and therefore that the latter is not due to corrupted data, but a hardware fault. A type III.2 reconfiguration is then decided on with resetting of the count and clock module 35 of FIG. 6.

Figure 15:
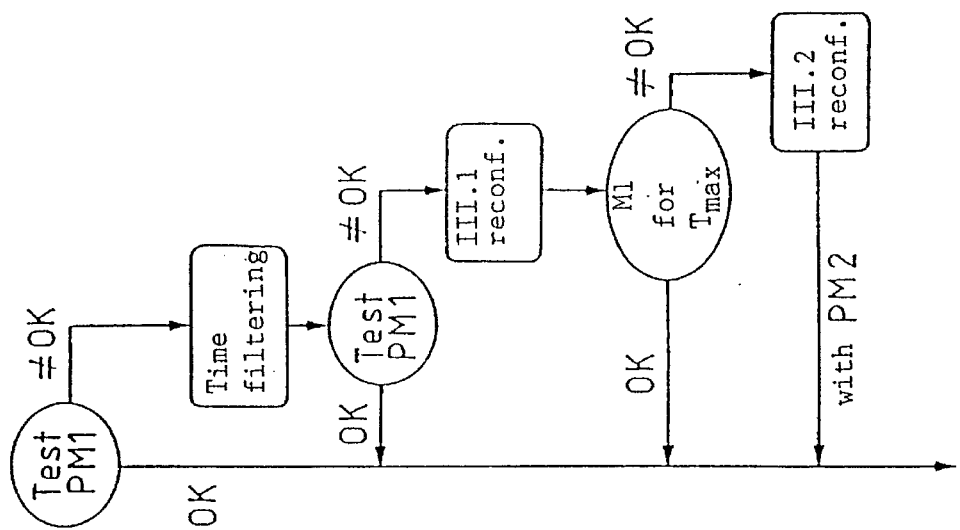
FIG. 15 is a flowchart relating to the FIG. 14 diagram.
Figure 14:
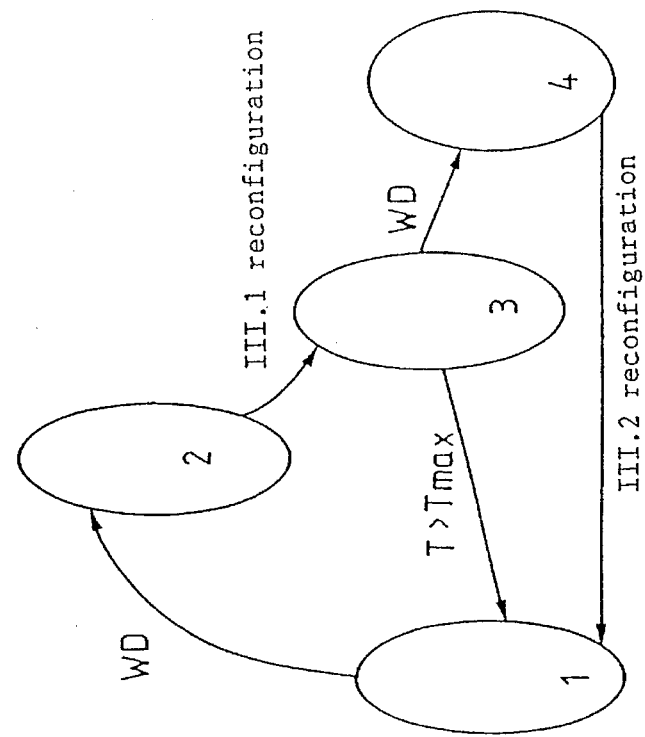
FIG. 14 is a diagram of the states of the reconfiguration module in a level III alarm situation.

FIG. 15 is a flowchart embodying the teaching of FIG. 14, with the various aforementioned tests, for instigating filtering to eliminate spurious alarms.

Figure 16:
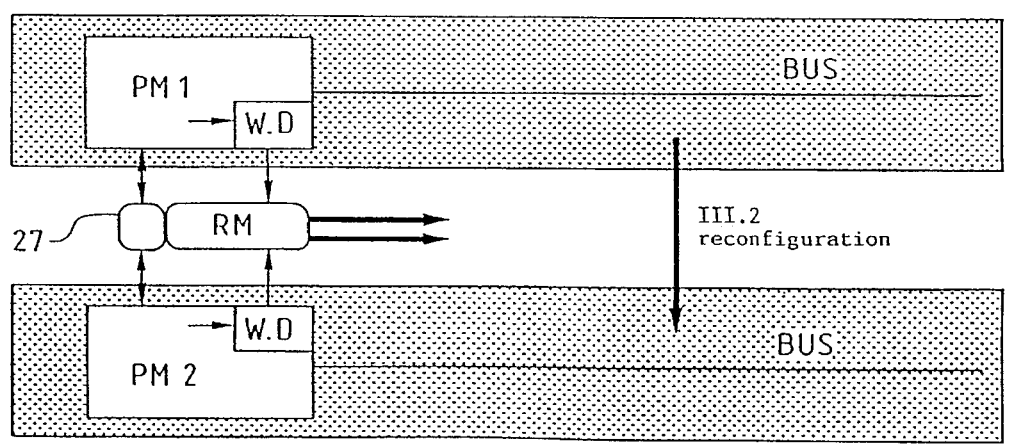
FIG. 16 is a diagram showing the principle of level III.2 reconfiguration.

The type III.2 reconfiguration is shown in the FIG. 16 diagram; it represents disconnection of the processor module PM1 used until this time (and its power converter—not shown) and activation of the remaining processor module PM2 (and the associated converter—not shown). Whether there is an available processor module or not is indicated in the data stored in the processor module reconfiguration unit 23 of the reconfiguration module; naturally switchover is not possible if there is no available processor module.

If this type III.2 reconfiguration is possible the system is returned to the original healthy state 1 of FIG. 14. Otherwise the decision as to how to react must be taken on the ground.

Another type of level III failure concerns the buses.

If hardware reliability makes it possible to eliminate the cross-coupling between the processor modules and the OBDH buses as has been the case until now, then a bus test procedure is adopted; this is part of the watchdog because in the event of a failure both the processor module and the bus are changed. This procedure is a synthesis of the level II tests; in other words, if all the coupler tests indicate that all the couplers have failed (for example, simultaneous failure of the five couplers of FIG. 1 despite filtering), or in the case of a level II error which persists after changing over to the appropriate redundant coupler, then the conclusion must be that all the couplers are a priori sound and the bus has failed. A level III.1 alarm is then sent to begin.

The objective of level IV is to be a safety level for the system as a whole. All detectable faults are assumed to have been processed by the lower level. Alarms and actions to be undertaken at level IV, therefore, relate to the system as a whole.

The system alarm signals SAL in question are generated according to whether various criteria are verified or not. These various criteria must in principle be verified if the satellite is healthy and the number and nature of these criteria are, insofar as this is possible, such that their verification signifies with a high level of probability that the satellite is healthy. Here these criteria are defined relative to external references and in the event of non-compliance with at least one of them (for example, loss of the Earth and/or of the Sun and/or of the Pole Star, etc.) signals SAL are sent to the reconfiguration module over the lines 2A. Other criteria may be included by generating appropriate SAL signals, concerning, for example, the electrical power supply of all or part of the satellite, the thermal conditions of a particular unit, etc. The generation of an SAL signal is frequently, but not systematically, accompanied by the generation of a level I or even II or III signal (for example, presumed failure of the Earth sensor in the event of loss of Earth signal, etc.).

Figure 17:
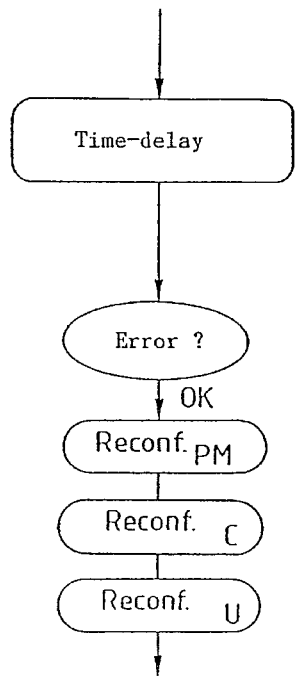
FIG. 17 is a diagram showing the principle of the level IV reconfiguration logic.

If a level IV alarm is sent and detected by the reconfiguration module it is not processed immediately (see FIG. 17). To leave sufficient time for the other levels to carry out their tasks and, therefore, to verify that a lower level (I, II, III) reaction is not sufficient a time-delay is introduced. This time-delay is longer than the maximum time-delay required for the longest configuration operation that may be in progress at a lower level. Also, this time-delay is chosen to agree with the attitude and orbit control strategy so that, even if system parameters are lost, there remains sufficient time to attempt a new acquisition. This time-delay on entering level IV is typically in the order of a few minutes (or possibly a few tens of seconds).

If the alarm is still present at the end of this time-delay processing of the alarm is commanded. A flag indicating that the alarm is of level IV is activated within the module 33 (see FIG. 6). The processor module and the associated power converter are changed as in the level III.2 situation and the flag indicating the alarm level is then tested. If the flag state indicates state IV, then the software commands reconfiguration of all the couplers and finally of all the units or of at least the couplers or units for which redundant modules are available. In other words, everything that can be reconfigured is reconfigured.

In this case there is a temporary mission outage pending action from the ground but the satellite remains in a safe mode.

To keep the levels independent and to avoid interaction between them, one aspect of the invention which is novel in itself proposes temporal discrimination or distinction logic.

The first idea that comes to mind in connection with a fault in a system is to attempt to deduce the faulty item on the basis of various self-test parameters. This solution requires complex software, however, with some ambiguity as to the origin of the fault which has caused the test parameters to go outside their normal limits. This is inevitable in the absence of one-to-one relationships between faults and self-test parameters.

The temporal distinction solution proposed by the invention is a strategy based on different time-delays for the various hierarchical system levels, i.e. from level I, the least critical, to level III, the most critical. The basic idea is to give sufficient time at each level III and II before instigating the procedure of lower levels; level IV, on the other hand, which deals with all lower levels conjointly, is assigned a time-delay greater than the reaction cycle duration of the lowest level.

In the event of loss of the bus 3, for example, whatever the reason, all units and all couplers will incorrectly be identified as faulty, with level III, II and I alarms occurring.

The temporal distinction strategy is to allow reconfiguration of couplers only after any higher level III (III.1 or III.2) reconfiguration has taken place to correct the fault at this level, should this be possible, and then to allow reconfiguration of units only after any reconfigurations of couplers have taken place to correct any faults at level II, should this be possible.

Thus in the above example of a faulty bus, after reconfiguration of the bus, the test parameters revert to their nominal ranges without any other reconfiguration at any lower level being needed.

Figure 18:
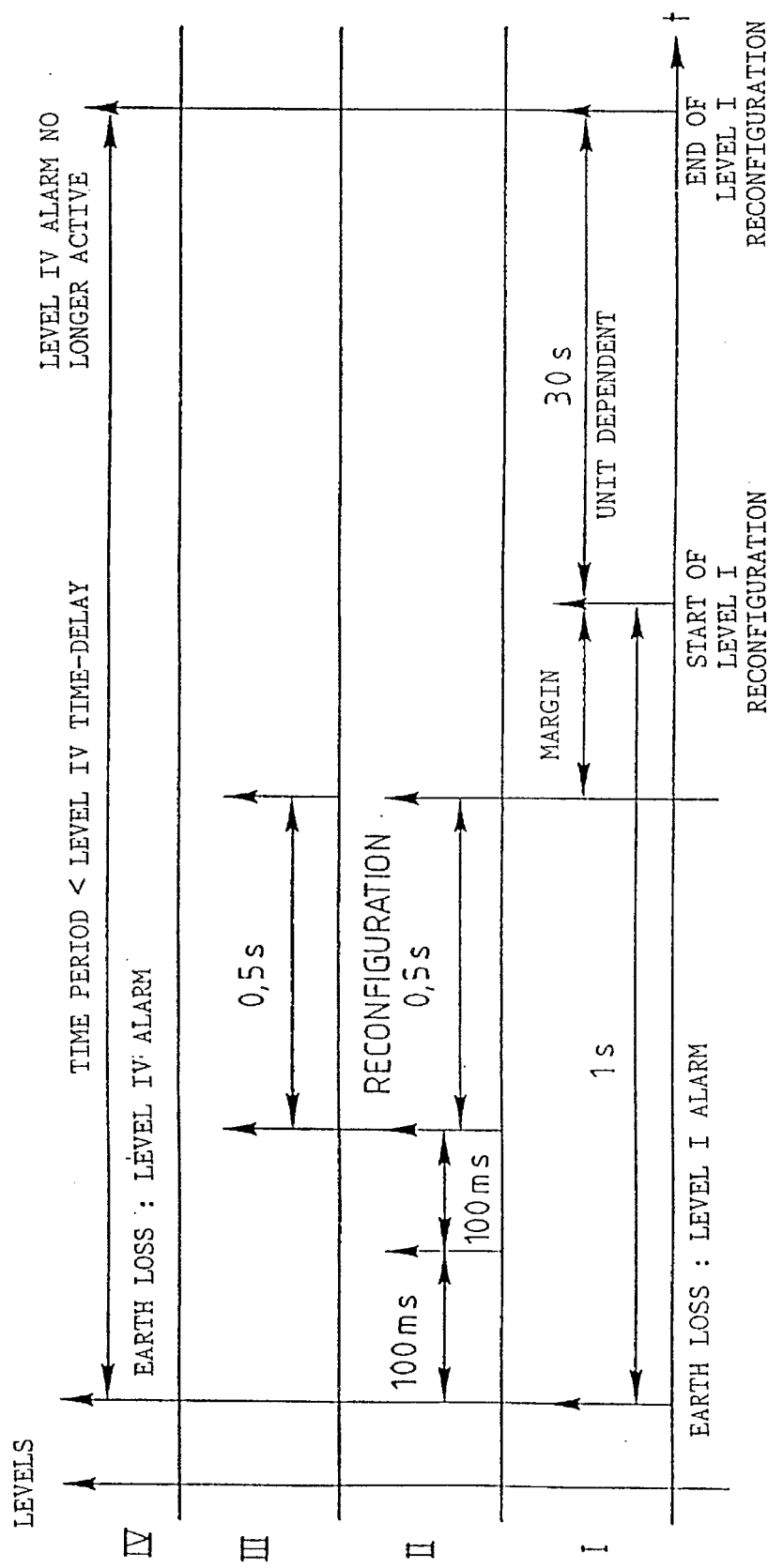
FIG. 18 is a timing diagram showing the temporal discrimination strategy adopted for processing level I, II, III, and IV alarms.

The timing diagram of FIG. 18 (the diagram is not to scale, to make the diagram clearer) shows another case, that of failure of the active terrestrial detector. Via the associated coupler and the bus 3 the processor module PM detects this fault and processes it as a level I fault. Loss of the Earth signal causes a level IV system alarm signal to be sent over a line 2A.

Let $t_0$ be the time at which the two alarms occur. The processor module starts the level I time-delay and the time-delay unit 32 of the reconfiguration module starts the level IV time-delay. This means that there will be no reaction to either alarm before the end of the time-delay.

Each of these alarms is processed without knowing if there is any other alarm. The reasoning explained below is subject to the following main rules:

any level III or II alarm disables lower level alarms (it has already been explained that at these levels an alarm is accompanied by alarms associated with components dependent on the faulty component; and the reaction to a level II or I alarm is executed only after allowing time for any higher level (III or II) reaction to have its effect.

It is assumed here that the period with which the state of the various components is scanned is 100 ms.

Thus any level III fault occurring at time $t_0$ would be detected in the next cycle ($t_0$+100 ms). Time filtering by one (or several) cycles is provided. If the III alarm is still present at $t_0$+200 ms it is validated and level III.1 reconfiguration is instigated after any time-delay, here a null time-delay. Following validation of a level III alarm the generation of a turn-off signal followed by the turning off of the active processor module is estimated to take 200 to 300 ms. Consequently, in this example and assuming a level III alarm, turn-off would occur at $t_0$+500 ms. This would disable any level I or II alarm processing. It is, therefore, necessary to provide for level II a time-delay such that no level II reaction can be instigated before $t_0$+500 ms.

If a level II alarm appeared at time $t_0$ it would be detected during the next scanning cycle (at $t_0$+100 ms) and, applying here also time filtering of 100 ms, would be validated at $t_0$+200 ms. A time-delay of 300 ms (or even longer) is sufficient to guarantee the condition arising from the analysis given above of the level III processing. As a precaution, a time-delay of 0.5 s is chosen, which yields, assuming a level II alarm, $t_0$+ 0.7 s; the processing of this level alarm would be accompanied by disabling of the level I alarm. It is, therefore, necessary to provide for level I a time-delay of at least 0.7 s to guarantee that no level I reaction is triggered before the triggering of a level II reaction.

A time-delay of one second is adopted here as a precaution.

In the example under consideration with reference to FIG. 18 there has been no level III or II alarm and the level I alarm is still present at the end of this one second time-delay: the Earth detector is, therefore, reconfigured. This takes around 30 seconds, which varies with the unit, which yields $t_0+31$ seconds.

In the example under consideration here the time-delay associated with level IV is one minute. As processing the level I alarm took 31 seconds and the new active Earth detector (assumed to be operating correctly) is again supplying valid signals, the level IV alarm disappears before the end of the level IV time-delay and no level IV reaction is deemed necessary. The system has reverted to the healthy state with no alarms.

Everything above presupposes the existence of an available redundant Earth detector, failing which the decision to continue the mission has to be taken on the ground.

It will be realized that the time-delay for authorizing a reconfiguration request at a given level is inversely proportional to the level: 1 s for level I, 0.5 s for level II, 0 ms for level III. The above reasoning makes it a simple matter to determine new values if the time filtering is to be increased to 200 ms or even more, for example.

A final level of reaction is provided directly by the ground operator, by disabling all reconfiguration modules. All the tasks undertaken until this time automatically on board can then be remotely commanded directly from the ground in substitution for the drivers of the reconfiguration modules. If both reconfiguration modules fail the nominal mission is preserved with level I processing effected on board and higher level processing effected from the ground.

It will be realized that the invention proposes a centralized system that is very reliable although of moderate mass and weight, adapted to manage thermal and energy aspects of the satellite and also attitude and orbit control.

As explained above, this centralized system embodies a plurality of optionally independent novel features.

It has been recognized that a large number of level III faults (processor module or even bus level) are not hardware faults; this is why a first stage of reconfiguration is to reset the same processor module as used until then. This goes against received wisdom in the art which is to act in response to a fault and thereafter to analyze the alarm signals, whereas the invention is based on doubting the seriousness of the fault detected, as it were, by introducing what might be termed hesitation or reluctance to react. This concept may be extended to any type of self-contained data management system featuring quick response in which the maximum benefit is to be obtained from each computer unit, or a single unit where there is only one.

The temporal distinction or discrimination strategy with successive processing of the various levels I, II, III starting with the most critical level and then continuing towards less critical levels, each time disabling reconfiguration requests from lower levels, ensures good independence between levels without using any complex and costly logic to detect the source of the fault. This temporal distinction strategy nevertheless makes it possible to locate and easily reconfigure a faulty unit in any data concentration structure in which a level n concentrates data from the next lower level (n−1) to transmit it to the next higher level (n+1). For each level, this strategy teaches periodic reviewing of parameters characteristic of this level (typical scanning cycle of 100 ms) and deciding on the basis of these if the unit concerned is faulty or only appears to be faulty. If the unit is or appears to be faulty a reconfiguration is instigated at this level, for at least the higher levels, by a reconfiguration or supervision module. This module (or even the processor module for the lowest levels) periodically tests all reconfiguration requests and if any such request is detected a time-delay is started whose limit value depends on the level in question (the more critical the fault level the shorter the time-delay), reconfiguration at this level occurring (with disabling of reconfiguration requests of lower levels) only if the reconfiguration request continues beyond this time-delay.

The system advantageously uses (see FIG. 1) internal parameters such as electrical or thermal or inertial parameters external to the satellite, selectable on board autonomously according to phases of the mission or in a manner that is fixed at the design stage, but the sources of which are connected directly to the reconfiguration module with no interface or any data transport intermediary other than direct electrical, radio or optical links such as the links 2A in FIG. 1.

The centralized system uses single internal redundancy with a reconfiguration module adapted to act autonomously on the processor modules and at the lower level at the initiative of these processor modules. The reconfiguration module is provided with a self-test unit and is supervised by the processor modules which are not able to act directly, so that all risk of looping is avoided. The reconfiguration module further embodies a backup memory unit so that all memory areas of the processor modules can be refreshed as and when required.

It goes without saying that the foregoing description has been given by way of non-limiting example only and that numerous variants may be put forward by one skilled in the art without departing from the scope of the invention. In particular, the number of independent levels may be increased above three without violating the aforementioned temporal discrimination rules.

Likewise, the invention may be generalized outside the space field to any data processing system requiring significant autonomy in the case of faults in a hostile medium such as the nuclear environment or isolated systems such as a submarine, for example.

What is claimed is:

1. A method of automatic fault detection and recovery in a data processing system, said data processing system comprising a central control unit, a plurality of system units, a bus, and a plurality of associated coupler units connecting said plurality of system units and said central control unit to said bus, wherein said central control unit comprises a watchdog circuit and a primary processor unit coupled to a reconfiguration module, and each of said plurality of coupler units further includes a corresponding, redundant backup coupler, said method comprising the steps of:

provided a second processor in parallel with said primary processor unit, said second processor not being in service while said primary processor unit is in service;

providing a backup reconfiguration module for said reconfiguration module, said backup reconfiguration module not being in service while said reconfiguration module is in service;

providing a backup bus for said bus;

providing at least one backup system unit for said plurality of system units;

coupling said reconfiguration module to said plurality of system units independently of said bus;

monitoring the operation of said central control unit and said plurality of system units;

upon detection of a fault, said watchdog circuit generating an alarm signal indicative of which component has malfunctioned within said data processing system;

classifying a fault type and severity based on said generated alarm signal; and selecting one of a plurality of fault recovery options based on the type and severity of said detected fault.

2. The method of claim 1, wherein the step of classifying fault type and severity comprises the steps of:

transmitting a first alarm signal to a first clock circuit, said first alarm signal being indicative that said primary processor may have failed;

initiating said first clock circuit for a first predetermined period of time; and selecting a fault recovery option of replacing said primary processor unit with said second processor to control said data processing system if a second alarm signal indicating said primary processor unit has failed is produced during said first predetermined period of time.

3. The method of claim 2, wherein said first predetermined period of time is between about 5 and about 60 seconds.

4. The method of claim 3, wherein said first predetermined period of time is approximately 10 seconds.

5. The method of claim 1, further comprising the step of providing a self-test unit in said reconfiguration module for determining whether said generated alarm signal is produced by alarm conditions or by test signals.

6. The method of claim 5, wherein said step of determining whether said generated alarm signal is produced by alarm conditions or by test signals comprises evaluating a voltage and pulse of said generated alarm signal.

7. The method of claim 2, further comprising the step of providing a self-test unit in said reconfiguration module for determining whether said first alarm signal and said second alarm signals are produced by alarm conditions or by test signals.

8. The method of claim 7, wherein said step of determining whether said first alarm signal and said second alarm signal are produced by alarm conditions or by test signals comprises evaluating a voltage and pulse of said first and second alarm signals.

9. The method of claim 2, further comprising the steps of:

monitoring the operation of said plurality of coupler units based upon signals received by said primary processor unit;

initiating a second clock circuit for a second predetermined period of time at least equal to a time needed to turn off and on said primary processor unit when a signal is received in said primary processor unit indicating that one of said plurality of coupler units is malfunctioning;

disabling said second clock circuit if said primary processor unit is turned off and on as a selected recovery option before the expiration of said second predetermined period of time; and selecting a recovery option of replacing said malfunctioning coupler unit with said backup coupler after the expiration of said second predetermined period of time.

10. The method of claim 9, wherein said second predetermined period of time is between about 0.5 and about 50 seconds.

11. The method of claim 9, further comprising the step of utilizing a driver external to said primary processor unit to replace said malfunctioning coupler.

12. The method of claim 9, further comprising the steps of:

monitoring the operation of said plurality of system units based upon signals received by said primary processor unit to determine the existence of a malfunctioning system unit;

initiating a third clock circuit for a third predetermined period of time at least equal to an amount of time required to complete replacing of a malfunctioning coupler unit with one backup coupler unit of said at least one backup coupler unit; and selecting a recovery option of replacing said malfunctioning system unit with one backup system unit of said at least one backup system unit when said system unit still appears malfunctioning after the expiration of said third predetermined period of time.

13. The method of claim 12, wherein said third predetermined period of time is between about 1 and 10 seconds.

14. The method of claim 13, wherein said second predetermined period of time is approximately 0.5 seconds and said third predetermined period of time is approximately 1 second.

15. The method of claim 12, wherein said data processing system is located in a spacecraft, said method further comprising the steps of:

monitoring an attitude of said spacecraft and after expiration of a fourth predetermined period of time, selecting a recovery option of replacing said primary processor unit with said second processor;

replacing said reconfiguration module with said backup reconfiguration module;

replacing each of said plurality of coupler units with said corresponding redundant backup couplers; and replacing said bus with said backup bus.

16. The method of the claim 15, wherein said fourth predetermined period of time is equal to or greater than 1 minute.

17. The method of claim 16, wherein said fourth predetermined period of time is between about 1 minute and about 10 minutes.

18. The method of claim 1, wherein the step of classifying fault type and severity comprises the steps of:

monitoring the operation of said plurality of coupler units based upon signals received by said primary processor unit;

initiating a second clock circuit for a second predetermined period of time at least equal to a time needed to turn off and on said primary processor unit when a signal is received in said primary processor unit indicating that one of said plurality of coupler units is malfunctioning;

disabling said second clock circuit if said primary processor unit is turned off and on as a selected fault recovery option before the expiration of said second predetermined period of time; and selecting a fault recovery option of replacing said malfunctioning coupler unit with said backup coupler after the expiration of said second predetermined period of time.

19. The method of claim 18, wherein said second predetermined period of time is between about 0.5 and about 50 seconds.

20. The method of claim 18, wherein said second predetermined period of time is between about 0.5 and about 5 seconds.

21. The method of claim 18, further comprising the step of utilizing a driver external to said primary processor unit to replace said malfunctioning coupler.

22. The method of claim 18, further comprising the steps of:
monitoring the operation of said plurality of system units based upon signals received by said primary processor unit to determine the existence of a malfunctioning system unit;
initiating a third clock circuit for a third predetermined period of time at least equal to an amount of time required to complete replacing of a malfunctioning coupler unit with one said at least one backup coupler unit; and
selecting a recovery option of replacing said malfunctioning unit with one said at least one backup system unit when said system unit still appears malfunctioning after the expiration of said third predetermined period of time.

23. The method of claim 22, wherein said third predetermined period of time is between about 1 and 10 seconds.

24. The method of claim 23, wherein said second predetermined period of time is approximately 0.5 seconds and said third predetermined period of time is approximately 1 second.

25. The method of claim 22, wherein said data processing system is located in a spacecraft, said method further comprising the steps of:
monitoring an attitude of said spacecraft and after expiration of a fourth predetermined period of time, selecting a recovery option of replacing said primary processor with said second processor;
replacing said reconfiguration module with said backup reconfiguration module;
replacing each of said plurality of coupler units with said corresponding redundant backup couplers; and
replacing said bus with said backup bus.

26. The method of claim 25, wherein said fourth predetermined period of time is equal to or greater than 1 minute.

27. The method of claim 26, wherein said fourth predetermined period of time is between about 1 minute and about 10 minutes.

28. A centralized data processing system located in a hostile environment comprising:
a plurality of processor control modules;
a plurality of buses;
a plurality of system units including at least one backup system unit;
a plurality of couplers including a plurality of backup couplers which connect said plurality of system units to said plurality of processor control modules via one of said plurality of buses; and
a plurality of reconfiguration modules for replacing said plurality of couplers with said plurality of backup couplers independent of said plurality of processor control modules, each reconfiguration module of said plurality of reconfiguration modules comprising:
a data transfer bus;
a self-test unit connected to said data transfer bus;
a processor module reconfiguration unit connected to said self-test unit;
a first test verification unit connected to said processor module reconfiguration unit;
a coupler reconfiguration unit connected to said data transfer bus;
a second test verification unit connected to said coupler reconfiguration unit;
an interface module connected to said data transfer bus; and
an output means connected to each reconfiguration module of said plurality of reconfiguration modules and each coupler of said plurality of couplers.

29. The centralized data processing system in accordance with claim 28, further comprising a backup memory provided in each reconfiguration module of said plurality of said reconfiguration modules.

* * * * *